(12) United States Patent
Heuver

(10) Patent No.: US 6,701,797 B2
(45) Date of Patent: Mar. 9, 2004

(54) PARKING ASSEMBLY

(75) Inventor: Bradley Ronald Heuver, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 09/754,165

(22) Filed: Jan. 4, 2001

(65) Prior Publication Data

US 2002/0084149 A1 Jul. 4, 2002

(51) Int. Cl.[7] .................................................. B60T 1/06
(52) U.S. Cl. ............................ 74/473.18; 74/473.12; 192/219.5
(58) Field of Search ..................... 74/473.1, 473.12, 74/473.18; 192/219.5, 221

(56) References Cited

U.S. PATENT DOCUMENTS

| | | | | |
|---|---|---|---|---|
| 4,223,768 A | * | 9/1980 | Iwanaga ........................ | 188/69 |
| 4,235,123 A | * | 11/1980 | Simancik et al. ............... | 477/99 |
| 4,462,487 A | * | 7/1984 | Warwick et al. .......... | 188/106 F |
| 4,519,270 A | * | 5/1985 | Kawaguchi et al. ........... | 74/535 |
| 5,067,366 A | * | 11/1991 | Gandiglio ................ | 188/106 P |
| 5,357,820 A | * | 10/1994 | Moroto et al. ................. | 74/335 |
| 5,509,868 A | * | 4/1996 | Eaton .......................... | 475/119 |
| 5,623,408 A | * | 4/1997 | Motamedi et al. .......... | 180/170 |
| 5,649,457 A | * | 7/1997 | Kudou et al. ................ | 475/210 |
| 5,794,748 A | * | 8/1998 | Heuver et al. ................. | 188/31 |

FOREIGN PATENT DOCUMENTS

| | | | |
|---|---|---|---|
| JP | 09144878 | * | 6/1997 |
| JP | 10166880 | * | 6/1998 |
| JP | 2001030883 | * | 2/2001 |
| KR | 328980 | * | 3/2000 |

* cited by examiner

Primary Examiner—David A. Bucci
Assistant Examiner—Julie K. Smith
(74) Attorney, Agent, or Firm—David B. Kelley

(57) ABSTRACT

A parking assembly 10 is provided for use in combination with a vehicle of the type having a park gear 12 and a shifter or shifting assembly 14 which is operatively used to select between several "gears" or vehicle operating modes. The parking assembly 10 includes a selectively and pivotally movable parking pawl member 20, a park rod assembly 22, and a servo mechanism 24 which selectively actuates park rod 22. The servo mechanism 24 is controlled by use of a controller 30 which monitors several sensors 32, 34 and which allows the park event to be calibrated based upon various selectable vehicle conditions or attributes.

20 Claims, 1 Drawing Sheet

PARKING ASSEMBLY

FIELD OF THE INVENTION

This invention relates to a parking assembly and more particularly, to a parking assembly which is adapted for use with a vehicle, which utilizes a servo mechanism to selectively engage and disengage the park gear of the vehicle, and which allows the parking event to be calibrated to minimize disengagement noise, to prevent engagement under certain undesirable conditions, and to tailor shift efforts.

BACKGROUND OF THE INVENTION

Parking mechanisms or assemblies are used in automotive vehicles to allow the vehicle to enter into and maintain a "parked" condition or state. Parking assemblies typically include a park rod or cam which selectively actuates a parking pawl which operatively engages the vehicle's park gear, thereby maintaining the vehicle in a "parked" position or state.

The park rod is typically mechanically linked to the vehicle's shifter and moves in response to shifter movement. When the shifter is moved to the "park" position, a cam which is disposed on the park rod engages the "parking pawl" which pivots or rotates into a position where it is disposed between a pair of teeth on the park gear, thereby substantially preventing the park gear and the output shaft from further rotating.

The park rod includes a spring which is sometimes compressed during the engagement with the parking pawl. Particularly, the spring within the park rod is compressed only during certain shifts into park. For instance, when the park rod cam engages the parking pawl and causes it to pivot into the park gear, the parking pawl is sometimes pivoted into and forcibly abuts a tooth of the park gear. During these types of shifts, the pivotal movement of the parking pawl is temporarily limited or stopped, thereby preventing further movement of the cam until the park gear is rotated and causing the spring within the park rod to be compressed. When the park gear rotates, the parking pawl slides along the tooth which it abuts until it "drops into" or is forced into a space between teeth of the park gear. During other shifts into the park position, the parking pawl is engaged by the cam and is rotated or pivoted directly into a space between gear teeth. During these types of shifts, the path of travel of the park rod is substantially unobstructed and the spring within the park rod is not compressed. The resulting inconsistency of spring compression causes the force required to shift the vehicle into park to vary from shift to shift. Because the shifter is mechanically coupled to the park rod in these prior systems, the user or driver of the vehicle undesirably "feels" or experiences inconsistent or different forces at the shifter when shifting the vehicle into park. Furthermore, when shifting a vehicle out of the park position while the vehicle is disposed on an incline, the loading of the park pawl will vary with the loading of the vehicle. This causes the park "pull out" load to vary based upon the vehicle weight and incline. This load variation is likewise undesirably experienced by an operator of the vehicle.

Another drawback with these prior mechanical systems occurs when a driver inadvertently shifts into park while the vehicle is still moving. Particularly, if the vehicle is moving above a certain speed, the parking pawl may not fully engage the park gear, but rather "ratchets" against the gear, thereby creating an unaesthetic sound and vibration and potentially damaging the parking pawl and park gear.

Moreover, when residual torque remains within the output shaft during a parking event (e.g., when the vehicle is parked on an inclined or declined surface), the park gear imparts a torsional force or load on the parking pawl which may be transmitted through the park rod and may result in undesirable vibrations which can be "felt" or experienced at the vehicle's shifter.

Vehicles which utilize a "shift by wire" system, where the shifter is mechanically coupled to and actuates the park rod by use of a wire or cable, suffer from other drawbacks. By way of example and without limitation, the cable may act as a noise and/or vibration path or medium which generates undesirable noise and/or vibration that can be experienced within the passenger compartment.

There is therefore a need for a new and improved parking assembly for use in a vehicle which overcomes many, if not all, of the previously delineated drawbacks of such prior parking assemblies.

SUMMARY OF THE INVENTION

A first advantage of the invention is that it provides a calibratable parking assembly which overcomes at least some of the previously delineated drawbacks of prior parking assemblies.

A second advantage of the invention is that it allows the parking event to be calibrated based upon various selectable vehicle conditions and/or attributes.

A third advantage of the invention is that it provides for a consistent load at the vehicle's shifter assembly each time the vehicle is shifted into and out of park.

A fourth advantange of the invention is that it prevents the vehicle from being shifted into park under certain conditions.

According to a first aspect of the present invention, a parking assembly is provided for use in combination with a vehicle of the type having a park gear and a shifter which is selectively movable into a park position. The parking assembly includes a pawl member which is selectively movable between a first position in which the pawl member is remote from the park gear, and a second position in which the pawl member engages the park gear; a park rod or cam which selectively engages the pawl member effective to cause the pawl member to move from the first position to the second position, and which selectively disengages the pawl member effective to cause the pawl member to move from the second position to the first position; and a servo assembly which is coupled to the park rod and which is effective to selectively move the park rod in response to movement of the shifter, thereby causing the park rod to engage and disengage the pawl member.

According to a second aspect of the present invention, a method is provided for selectively engaging a parking assembly in a vehicle of the type having a park gear and a parking pawl which selectively engages the park gear. The method includes the steps of: providing a servo assembly; providing a member for selectively contacting the parking pawl; coupling the member to the servo assembly; and selectively activating the servo assembly to cause the member to engage the parking pawl thereby causing the parking pawl to engage the park gear.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
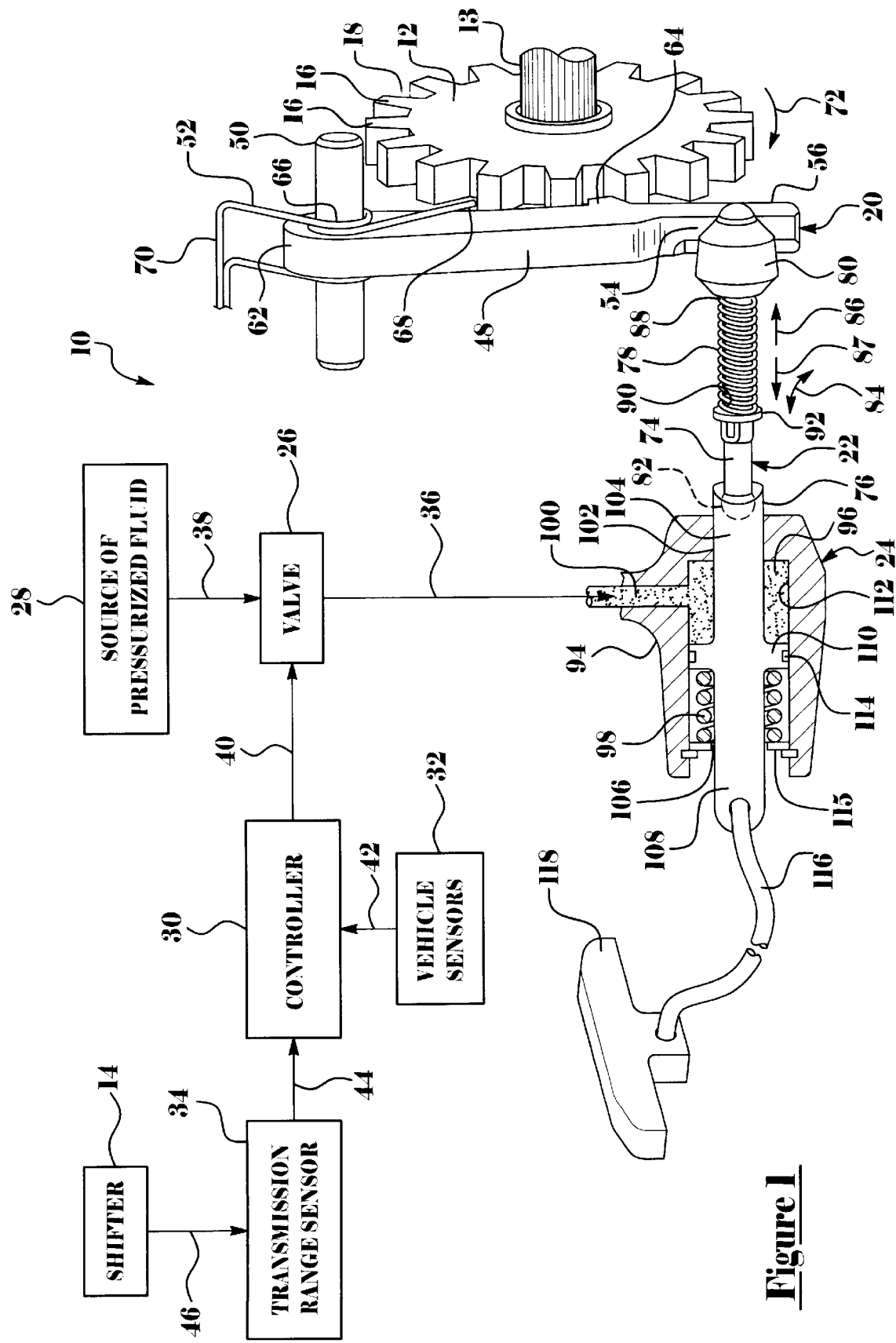
FIG. 1 is a schematic diagram a parking assembly, which is made in accordance with the teachings of the preferred embodiment of the invention, and which is deployed within a conventional transmission assembly.

Referring now to FIG. 1, there is shown a parking assembly 10, which is made in accordance with the teachings of the preferred embodiment of the invention. Assembly 10 is adapted for use in combination with a vehicle of the type having a park gear 12 and a shifter or shifting assembly 14.

Park gear 12 is a conventional park gear which is fixedly coupled to the vehicle's output shaft 13, and which selectively rotates with the output shaft 13. Park gear 12 includes several peripherally disposed and substantially identical teeth or projecting portions 16. Each tooth 16 is separated by a cavity or recessed portion 18. As described more fully and completely below, the parking pawl member 20 selectively engages and/or resides within a unique one of cavities 18, thereby substantially preventing the park gear 12 and output shaft 13 from rotating.

In the preferred embodiment, shifting assembly 14 is a conventional shifter which is operatively and selectively movable between several positions, such as a "park" position, a "reverse" position, a "neutral" position, and a "drive" position, which respectively correspond to various operating states or operating modes of the vehicle. In other alternate embodiments, shifter 14 may comprise other types of shifters, such as a push-button shifter.

Parking assembly 10 includes a selectively and pivotally movable parking pawl 20, a park rod assembly 22, and a servo mechanism or assembly 24 which selectively actuates park rod 22. Servo assembly 24 is operatively and communicatively coupled to an electronically controlled valve assembly 26 (e.g., a solenoid valve) by use of a conduit 36, and valve 26 is communicatively coupled to a source of pressurized fluid 28 (e.g., a conventional fluid reservoir and pump assembly) by use of a conduit 38. As explained more fully and completely below, the pressurized fluid received through conduit 36 controls the operation of servo assembly 24. In other alternate embodiments, the servo assembly 24 may be actuated by other pressurized material (e.g., air or gas) or by an electromagnetic actuator.

Valve assembly 26 is further communicatively coupled to a conventional electronic controller 30 by use of bus 40. Controller 30 controls the operation of valve 26 based upon data (e.g., vehicle speed data, gear selected and/or time data) received from vehicle sensors 32 and transmission range sensor 34, which are respectively and communicatively coupled to controller 30 by use of busses 42, 44. Sensors 32 are conventional vehicle attribute sensors which are effective to measure or sense certain vehicle attributes (i.e., vehicle speed data) and to communicate signals to controller 30 representing those measured attributes. Transmission range sensor 34 is further communicatively coupled to shifter 14 by use of bus 46 and is effective to sense or detect the position of shifter 14. In other alternate embodiments, transmission range sensor 34 may be mechanically coupled to the shifter 14.

Parking pawl 20 includes a pawl member 48 which is pivotally and/or rotatably coupled to a park pawl shaft 50, and a return spring 52. Pawl member 48 includes a rod engaging side or surface 54, which abuttingly engages park rod cam 80, a gear engaging side or surface 56, and a generally rounded end portion 62. Side or surface 56 includes a generally rectangular tooth or projecting portion 64 which selectively engages cavity 18 of park gear 12. Rounded end portion 62 includes a generally circular aperture 66 through which rod 50 operatively extends. Rod 50 is fixedly disposed within the transmission housing (not shown) in a conventional manner.

Spring member 52 is a conventional return spring which is wrapped or coupled around rod member 50. Spring 52 includes a first end 68 which is operatively and conventionally coupled to pawl member 48 and a second end 70 which is coupled to a portion of the transmission housing (not shown). Spring member 52 provides and/or imparts a force upon pawl member 48 in the direction illustrated by arrow 72.

Park rod assembly 22 includes an upper rod portion or member 74, a lower rod or servo piston portion or member 76, a cam or pawl engaging member 80 which is slidably disposed on portion 74, and a spring member 78 which is operatively disposed around portion 74 and abuttingly engages cam member 80. Upper rod portion 74 is pivotally coupled to lower rod portion 76 by use of a conventional ball and socket joint 82. In this manner, upper rod portion 74 is able to flex or move with respect to lower rod portion 76 in the directions of arrows 84 when cam member 80 engages pawl member 48. Cam member 80 is slidably disposed on portion 74 and is movable relative to portion 74 in the directions of arrows 86, 87. The upper end 88 of spring 78 abuts cam member 80 and the lower end 90 of spring 78 abuts a washer or ridge 92 which is coupled to or fixedly disposed relative to portion 74.

It should be appreciated that the present assembly 10 may be used with various other types of parking pawl actuating systems, such as rotatable cam systems or any other type of system which is suitable to cause parking pawl 20 to engage park gear 12.

Park rod 22 is selectively movable in the directions of arrows 86, 87 by use of servo assembly 24, as described more fully and completely below. Servo assembly 24 includes a housing 94 having a generally cylindrical inner cavity or chamber 96 in which piston 76 is slidably disposed; a spring 98 which is disposed within chamber 96; and an inlet port or conduit 100 which is integrally formed within housing 94 and which is fluidly coupled to chamber 96 and conduit 36. Housing 94 is made from a conventional durable material, such as a metal material and is fixedly attached to the transmission housing (not shown) or another structural portion of the vehicle. Housing 94 includes a front aperture or orifice 102 which communicates with chamber 96 and which operatively receives front shaft portion 104 of piston 76. Particularly, front shaft portion 104 is slidably and sealably disposed within orifice 102. Housing 94 further includes a rear aperture or orifice 106 which communicates with chamber 96 and which operatively receives rear shaft portion 108 of piston 76. Particularly, rear shaft portion 108 is slidably disposed within orifice 106.

Piston 76 includes a widened body portion 110 which is disposed between front and rear shaft portions 104, 108. Body portion 110 slidably engages the inner surface 112 of housing 94 which forms cavity 96. Body portion 110 further includes an annular seal or o-ring 114 which is peripherally disposed around body 110 and which sealably engages surface 112, thereby preventing pressurized fluid from entering the side of chamber 96 which contains spring 98. Spring 98 operatively engages body 110 and the back portion 115 of housing 94. Spring 98 is effective to impart a biasing force to piston 76 (e.g. to body portion 110) in the direction of arrow 86.

It should be appreciated that the foregoing servo assembly 24 has been described for illustrative purposes only and that many modifications and/or different types of servo assemblies may be used to actuate park rod 22 or a cam style system (not shown). Moreover, in one non-limiting embodiment of the invention, servo assembly 24 is replaced with or includes an electromagnetic actuator which is communicatively coupled to controller 30 and which is effective to selectively move park rod 22 in the directions of arrows 86 and 87.

In the preferred embodiment, portion 108 of servo piston 76 is operatively coupled to a conventional cable 116 which is coupled to a handle 118. Handle 118 is preferably disposed within the engine compartment or passenger compartment of the vehicle and provides a "back-up" or override mechanism for manually actuating park rod 22 in the event of a servo, valve or hydraulic system fault. In alternate embodiments, this "back up" release may be activated by a servo of any type as well as by other manual mechanical actuators.

In operation, controller 30 monitors transmission range sensor 34 and vehicle sensors 32. When the vehicle is in a "parked" condition or state, valve assembly 26 is in a closed condition and substantially no or little fluid pressure is communicated to chamber 96. As a result, the spring 98 is in an extended position which causes cam 80 to engage parking pawl 20, thereby forcing pawl member 48 (i.e., tooth 64) into gear 12 and holding the vehicle in park.

When the shifter 14 is moved out of the park position, transmission range sensor 34 detects the movement and generates a signal to controller 30 indicating that the vehicle has been moved out of the park position. Upon receipt, controller 30 checks various vehicle attributes to determine whether a shift out of park is desirable or allowable. Particularly, in the preferred embodiment of the invention, controller 30 determines or ensures that the engine or vehicle has been "turned on" or activated prior to disengaging the park gear. As such, the present invention may be used to prevent unauthorized towing of the vehicle. In an alternate embodiment, controller 30 monitors vehicle sensors 32 to determine or ensure the vehicle's brake pedal (not shown) has been depressed prior to disengaging the park gear 12. In this manner, the present invention would prevent undesired or unexpected vehicle movement which may occur when the park gear 12 is disengaged and the brake pedal is not depressed. In other alternate embodiments, various other vehicle attributes or parameters may be monitored or checked to determine whether a shift out of park is desirable or allowable.

If the controller 30 determines that a shift out of park is allowable, controller 30 generates a signal to valve assembly 26, effective to open valve assembly 26, thereby allowing fluid pressure to be communicated to chamber 96 by way of conduits 38, 36 and 100. The pressurized fluid communicated to chamber 96 is effective to move piston 76 in the direction of arrow 87 relative to housing 96. As a result, park rod 22 moves in the direction of arrow 87, thereby causing cam 80 to disengage pawl member 48. Pawl member 48 then moves in the direction of arrow 72, thereby releasing the park gear 12. Spring 52 holds pawl member 48 in this position until the next engagement sequence.

When the vehicle and/or transmission is shifted into the "park" position, transmission range sensor 34 detects the movement of shifter 14 and generates a signal to controller 30 indicating that shifter 14 has been moved to the park position. Upon receipt of the signal, controller 30 checks various vehicle attributes to determine whether a shift into park is desirable or allowable. Particularly, in the preferred embodiment of the invention, controller 30 determines or ensures that the engine or vehicle has been "stopped" or has a speed which is below a predetermined value. As such, the present invention may be use to prevent ratcheting which may occur when a vehicle is unintentionally shifted to park while the vehicle is still moving. In the preferred embodiment, controller 30 also delays engagement upon detecting powertrain "windup" or residual torque, thereby allowing the stored energy to be dissipated prior to engaging the parking pawl 20. Particularly, by delaying engagement of the parking pawl 20 (e.g., by a few milliseconds), the pawl/gear engagement will occur after the output shaft 13 and park gear 12 have unwound, thereby eliminating the noise and vibration harshness which would otherwise occur. This will also substantially prevent or reduce the vehicle's "roll distance", unlike prior strictly mechanical systems. Controller 30 may also monitor other vehicle sensors (e.g., an ignition switch position sensor), and automatically shift the vehicle into park if the ignition is turned off, thereby preventing a driver from unintentionally leaving a vehicle in gear or in neutral after turning off the ignition. In other alternate embodiments, various other vehicle attributes or parameters may be monitored or checked to determine whether a shift into park is desirable or allowable.

If the controller 30 determines that a shift into park is allowable, controller 30 generates a signal to valve assembly 26, effective to close valve assembly 26, thereby preventing fluid pressure to be communicated to chamber 96. As a result, the force imparted by spring 98 is effective to cause piston 76 to move in the direction of arrow 86 relative to housing 96. As a result, park rod 22 moves in the direction of arrow 86, thereby causing cam 80 to engage parking pawl 20 and forcing pawl member 48 into engagement with park gear 12.

In this manner, parking assembly 10 ensures that the vehicle is only shifted into and out of park if certain desirable conditions or attributes are present. Importantly, the parking assembly 10 provides full electronic control of the park system and allows deletion of all mechanical components associated with prior systems, such as a manual control shaft, inner and outer manual levers, shift cabling, detent springs and other structural components. Furthermore, because the shifter 14 is not mechanically coupled to park rod 22, assembly 10 allows for a total customization of shifter "feel" and park pullout efforts, while deleting the potential noise path provided by the shifter cable. Additionally, due to the elimination of this mechanical coupling, the shifting effort will be consistent regardless of the inclination of the vehicle, vehicle loading or the position of the park gear. The elimination of these mechanical components will also allow for different types of shifters to be used, such as a push-button shifter or other electronic shifter. Assembly 10 further eliminates the shift cable adjustment procedures during assembly, as the shift cable is not needed. The assembly 10 also enables the steering intermediate shaft to be made without the mechanical linkage which is used to shift the transmission in certain vehicles. The assembly 10 also provides packaging improvements, as it is smaller than conventional systems.

It is to be understood that the invention is not to be limited to the exact construction and/or method which has been illustrated and discussed above, but that various changes and/or modifications may be made without departing from the spirit and the scope of the invention.

What is claimed is:

1. A parking assembly for use in combination with a vehicle of the type having a park gear and a shifter which is selectively movable into a park position, said parking assembly comprising:

a pawl member which is selectively movable between a first position in which said pawl member is remote from said park gear, and a second position in which said pawl member engages said park gear;

a park rod comprising an upper rod and a lower rod wherein said upper rod is coupled to said lower rod by a ball and socket joint wherein said upper rod selectively engages said pawl member effective to cause said pawl member to move from said first position to said second position, and which selectively disengages said pawl member effective to cause said pawl member to move from said second position to said first position; and a servo assembly which is coupled to said lower rod of said park rod and which is effective to selectively move said park rod in response to movement of said shifter, thereby causing said park rod to engage and disengage said pawl member.

2. The parking assembly of claim 1 wherein said servo assembly further comprises:

a housing having an interior chamber;

a piston which is slidably disposed within said interior chamber and which is coupled to said park rod; and a conduit which is fluidly coupled to said interior chamber and which is effective to selectively communicate pressurized material to said chamber, said pressurized material being effective to move said piston in a first direction, said movement in said first direction being effective to cause said park rod to disengage said pawl member.

3. The parking assembly of claim 2 wherein said servo assembly further comprises:

a spring which is operatively disposed within said servo assembly and which selectively engages said piston, said spring being effective to move said park rod in a second direction, said movement in said second direction being effective to cause said park rod to engage said pawl member.

4. The parking assembly of claim 3 further comprising:

a source of pressurized material which is fluidly coupled to said conduit by use of a valve assembly; and a controller which is communicatively coupled to said valve assembly and which is effective to selectively actuate said valve assembly based upon at least one vehicle parameter, thereby selectively communicating pressurized material to said chamber.

5. The parking assembly of claim 4 further comprising:

a transmission range sensor which is operatively coupled to said shifter and to said controller, said transmission range sensor being effective to communicate a position of said shifter to said controller.

6. The parking assembly of claim 5 wherein said at least one vehicle parameter comprises a position of said shifter.

7. The parking assembly of claim 6 wherein said at least one vehicle parameter further comprises a speed of said vehicle.

8. The parking assembly of claim 7 wherein said at least one vehicle parameter comprises an ignition switch position of said vehicle.

9. A parking assembly for use in combination with a vehicle of the type having a rotatable park gear, a parking pawl which selectively engages and disengages said park gear, and a shifter which is selectively movable to a park position, said parking assembly comprising:

a first member comprising an upper member and a lower member, wherein said upper member is flexibly coupled to said lower member by a ball and socket joint, said first member being selectively movable between a first position in which said first member causes said parking pawl to engage said park gear and a second position in which said first member causes said parking pawl to disengage said park gear;

a housing having an inner cavity;

a piston which is slidably disposed within said inner cavity and which includes a shaft portion which extends from said housing and which is coupled to said lower member of said first member;

a source of pressurized fluid which is selectively and fluidly coupled to said inner cavity by use of an electronically controlled valve assembly; and a controller which is communicatively connected to said valve assembly and which selectively opens and closes said valve assembly based upon the position of said shifter, thereby causing said pressurized fluid to be selectively communicated to said inner cavity, said pressurized fluid being effective to move said piston within said inner cavity, thereby causing said first member to move between said first and said second positions.

10. The assembly of claim 9 further comprising:

a spring member which is operatively disposed within said inner cavity and which selectively engages said piston, said spring member being effective to move said piston in a first direction which causes said first member to move to said first position.

11. The assembly of claim 10 further comprising a manual release cable which is operatively coupled to said piston and which is effective, when pulled, to move said piston in a second direction which causes said first member to move to said second position.

12. The assembly of claim 9 wherein said controller is coupled to at least one vehicle attribute sensor and is effective to monitor at least one vehicle attribute and to selectively open and close said valve assembly further based upon said at least one vehicle attribute.

13. The assembly of claim 12 wherein said at least one vehicle attribute comprises vehicle speed.

14. The assembly of claim 12 wherein said at least one vehicle attribute comprises a residual torque value.

15. A method for selectively engaging a parking assembly in a vehicle of the type having a park gear and a parking pawl which selectively engages said park gear, said method comprising the steps of:

providing a servo assembly;

providing a member for selectively contacting said parking pawl;

pivotally coupling said member to said servo assembly using a ball and socket joint; and selectively activating said servo assembly to cause said member to engage said parking pawl, thereby causing said parking pawl to engage said park gear.

16. The method of claim 15 wherein said member comprises a park rod.

17. The method of claim 15 wherein said servo assembly is selectively activated by use of pressurized fluid.

18. The method of claim 15 wherein said servo assembly comprises an electromagnetic actuator.

19. The method of claim 15 further comprising the steps of:

monitoring a vehicle attribute; and determining whether to activate said servo assembly based upon said monitored attribute.

20. The method of claim 19 wherein said vehicle attribute comprises vehicle speed.

* * * * *